United States Patent
Kobori (10) Patent No.: US 9,447,715 B2
(45) Date of Patent: Sep. 20, 2016

(54) VALVE DEVICE FOR EXHAUST GAS FLOW PATH

(71) Applicant: Futaba Industrial Co., Ltd., Aichi (JP)

(72) Inventor: Kiyomichi Kobori, Aichi (JP)

(73) Assignee: Futaba Industrial Co., Ltd., Aichi (JP)

( * ) Notice: Subject to any disclaimer, the term of this patent is extended or adjusted under 35 U.S.C. 154(b) by 104 days.

(21) Appl. No.: 14/380,104

(22) PCT Filed: Feb. 20, 2013

(86) PCT No.: PCT/JP2013/054152
§ 371 (c)(1),
(2) Date: Aug. 21, 2014

(87) PCT Pub. No.: WO2013/125572
PCT Pub. Date: Aug. 29, 2013

(65) Prior Publication Data
US 2015/0027566 A1    Jan. 29, 2015

(30) Foreign Application Priority Data
Feb. 23, 2012 (JP) .................. 2012-037552

(51) Int. Cl.
*F01N 1/18*     (2006.01)
*F01N 1/16*     (2006.01)
(Continued)

(52) U.S. Cl.
CPC .............. *F01N 1/168* (2013.01); *F01N 1/08* (2013.01); *F01N 1/084* (2013.01); *F01N 1/088* (2013.01);
(Continued)

(58) Field of Classification Search
CPC ......................................... F01N 1/18

USPC ............................................. 137/527, 527.6
See application file for complete search history.

(56) References Cited

U.S. PATENT DOCUMENTS 2,394,471 A    2/1946  Paul
3,182,951 A    5/1965  Spencer
(Continued)

FOREIGN PATENT DOCUMENTS

DE    3541192 C1    11/1986
JP    09-195749 A    7/1997
(Continued)

OTHER PUBLICATIONS

The International Bureau, Extended European Search Report issued in corresponding European Application No. 13751846.0, dated Sep. 9, 2015.
(Continued)

*Primary Examiner* — John K Fristoe, Jr.
*Assistant Examiner* — Paul Gray
(74) *Attorney, Agent, or Firm* — Renner, Otto, Boisselle & Sklar, LLP (57) ABSTRACT

A valve device includes a butterfly valve and a first link member each supported by a stay so as to be rotationally movable about a first rotation axis and a second rotation axis, respectively, a second link member supported by the butterfly valve so as to be rotationally movable about a third rotation axis, and a spring to bias the butterfly valve in a valve closed direction. The first link member and the second link member are connected to each other so as to be mutually rotationally movable about a fourth rotation axis. An angle formed by a first link line connecting the second rotation axis and the fourth rotation axis to each other and a second link line connecting the third rotation axis and the fourth rotation axis to each other is formed to be the largest when the butterfly valve is in a valve closed state.

17 Claims, 9 Drawing Sheets

(51) Int. Cl.
*F01N 1/08* (2006.01)
*F16K 15/03* (2006.01)

(52) U.S. Cl.
CPC ............... *F01N 1/165* (2013.01); *F01N 1/166* (2013.01); *F01N 1/18* (2013.01); *F16K 15/033* (2013.01); *F01N 2240/36* (2013.01); *F01N 2290/10* (2013.01); *Y10T 137/7898* (2015.04)

(56) References Cited

U.S. PATENT DOCUMENTS

| | | | |
|---|---|---|---|
| 4,264,085 A * | 4/1981 | Volin | ........................ A61G 5/00 280/250.1 |
| 5,947,152 A | 9/1999 | Martin et al. | |

FOREIGN PATENT DOCUMENTS

| | | |
|---|---|---|
| JP | 10-137070 A | 5/1998 |
| JP | 10-141040 A | 5/1998 |
| JP | 2002-180446 A | 6/2002 |
| JP | 2003-003820 A | 1/2003 |

OTHER PUBLICATIONS

Japanese Patent Office, Office Action issued in corresponding Japanese Application No. 2012-037552, dated Nov. 10, 2015.

The International Bureau, International Preliminary Report on Patentability issued in corresponding International Application No. PCT/JP2013/054152, dated Aug. 23, 2014, 14 pp.

The International Bureau, Written Opinion issued in corresponding International Application No. PCT/JP2013/054152, dated Apr. 16, 2013, 4 pp.

Japanese Patent Office, International Search Report issued in corresponding International Application No. PCT/JP2013/054152 dated Apr. 16, 2013, 3 pp.

State Intellectual Property Office of China, English Translation of First Office Action for Chinese Patent Application No. 201380010358.6 dated Mar. 2, 2016, 7 pages.

Japanese Notice of Reason(s) for Rejection and English translation for corresponding Japanese Patent Application No. 2012-037552 mailed on May 31, 2016.

* cited by examiner

FIG.5A COMPARISON OF OPENING LOAD

DEGREE OF OPENING OF BUTTERFLY VALVE

FIG.5B FACTOR OF LOADING CHARACTERISTICS

DEGREE OF OPENING OF BUTTERFLY VALVE

VALVE DEVICE FOR EXHAUST GAS FLOW PATH

CROSS-REFERENCE TO RELATED APPLICATIONS

This international application claims the benefit of Japanese Patent Application No. 2012-037552 filed Feb. 23, 2012 in the Japan Patent Office, and the entire contents of Japanese Patent Application No. 2012-037552 are incorporated herein by reference.

TECHNICAL FIELD

The present invention relates to a valve device for an exhaust gas flow path.

BACKGROUND ART

There is known a valve device for an exhaust gas flow path to open and close a communicating flow path that communicates an upstream chamber and a downstream chamber with each other in an exhaust gas flow path for an in-vehicle internal combustion engine. In Patent Document 1 for example, there is disclosed a valve device disposed in a muffler for an internal combustion engine. An inside of the muffler is partitioned into an upstream chamber and a downstream chamber by a separator, and the valve device is provided to the separator to open and close an opening communicating the upstream chamber and the downstream chamber with each other. In the valve device, a valve body capable of closing the opening is supported by a support body so as to be rotatable about a rotation axis, and the valve body is biased in a valve closed direction by a coil spring.

When the number of revolutions of the internal combustion engine is low, an acting force exerted on the valve body by a pressure in the upstream chamber is smaller than an acting force exerted on the valve body by the sum of the biasing force of the coil spring and the pressure in the downstream chamber. Thus, the valve device is in a valve closed state in which the opening is closed. In contrast, when the number of revolutions of the internal combustion engine is increased, the acting force exerted on the valve body by the pressure in the upstream chamber becomes larger than the acting force exerted on the valve body by the sum of the biasing force of the coil spring and the pressure in the downstream chamber. Thus, the valve device is brought into a valve open state in which the valve body is spaced apart from the opening to thereby open the opening.

PRIOR ART DOCUMENTS

Patent Documents

Patent Document 1: Japanese Unexamined Patent Application Publication No. H09-195749

SUMMARY OF THE INVENTION

Problems to be Solved by the Invention

Such a valve device for an exhaust gas flow path is required to have a noise reduction function to reduce noise by closing the communicating flow path when the internal combustion engine is in a low revolution state, while being required to have a pressure loss reduction function to reduce pressure loss by opening the communicating flow path when the internal combustion engine is in a high revolution state. However, in the above-described configuration described in Patent Document 1, the more forward the valve body moves in a valve open direction, the larger the biasing force of the coil spring becomes. Therefore, when the spring force of the coil spring is designed to be stronger with an emphasis on the noise reduction function at the time of low revolution, the pressure loss reduction function at the time of high revolution is impaired. In contrast, when the spring force of the coil spring is designed to be weaker with an emphasis on the pressure loss reduction function at the time of high revolution, the noise reduction function at the time of low revolution is impaired.

In one aspect of the present invention, it is preferred for the valve device for an exhaust gas flow path to have both an improved noise reduction function at the time of low revolution and an improved pressure loss reduction function at the time of high revolution.

Means for Solving the Problems

A valve device for an exhaust gas flow path according to the present invention includes a valve body that is supported by a support body so as to be rotationally movable about a first rotation axis and that opens and closes a communicating flow path that communicates an upstream chamber and a downstream chamber in an exhaust gas flow path with each other, a first link member supported by the support body so as to be rotationally movable about a second rotation axis, a second link member supported by the valve body so as to be rotationally movable about a third rotation axis, and a biasing member to bias the valve body in a valve closed direction. The first link member and the second link member are connected to each other so as to be mutually rotationally movable about a fourth rotation axis. The first rotation axis, the second rotation axis, the third rotation axis, and the fourth rotation axis are parallel to one another in an axial direction. In a plane orthogonal to the axes, an angle formed by a first link line connecting the second rotation axis and the fourth rotation axis to each other and a second link line connecting the third rotation axis and the fourth rotation axis to each other is formed to be the largest in a state in which the communicating flow path is closed by the valve body.

According to such a configuration, the support body, the valve body, the first link member, and the second link member form a toggle mechanism of a link type. Therefore, in the state in which the communicating flow path is closed by the valve body (a valve closed state), the closer to 180 degrees (a state in which the first link line and the second link line are arranged in a straight line) the angle formed by the first link line and the second link line is, the stronger external force is required to rotationally move the valve body in a valve open direction. Accordingly, it is possible to make the external force required to open the valve body greater, while making a biasing force of the biasing member smaller, compared with a conventional configuration in which a valve body is kept in a valve closed state solely by means of a biasing member. As a result, it is possible to improve a noise reduction function at the time of low revolution of an internal combustion engine, as well as a pressure loss reduction function at the time of high revolution of the internal combustion engine.

The valve device for an exhaust gas flow path may be provided with a stopper mechanism to limit the angle formed by the first link line and the second link line to an angle smaller than 180 degrees. According to this configuration, a problem that the valve body cannot be normally opened when the angle formed by the first link line and the second link line has reached 180 degrees can be made less likely to occur.

The stopper mechanism may limit the angle formed by the first link line and the second link line to an angle smaller than 180 degrees by abutment of a first stopper portion provided on the first link member and a second stopper portion provided on the second link member against each other. According to this configuration, it is possible to reduce an influence of factors such as variations in parts dimensions and rattling of parts on a limit angle. As a result, the angle formed by the first link line and the second link line in the state in which the communicating flow path is closed by the valve body can be designed to be an angle closer to 180 degrees. Thus, it is possible to improve performance to keep a valve closed state against an external force.

EXPLANATION OF REFERENCE NUMERALS

1 . . . muffler, 5 . . . valve device, 10 . . . casing, 31 . . . first chamber, 32 . . . second chamber, 33 . . . third chamber, 41 . . . inlet pipe, 42 . . . outlet pipe, 43 . . . inner pipe, 51 . . . stay, 52 . . . butterfly valve, 53 . . . first link member, 54 . . . second link member, 55 . . . spring, 71 . . . first rotation axis member, 71A . . . first rotation axis, 72 . . . second rotation axis member, 72A . . . second rotation axis, 73 . . . third rotation axis member, 73A . . . third rotation axis, 74 . . . fourth rotation axis member, 74A . . . fourth rotation axis, 221 . . . communication hole, 411 . . . through-holes, 431 . . . opening, 531 . . . first stopper portion, 541 . . . second stopper portion, L1 . . . first link line, L2 . . . second link line

MODE FOR CARRYING OUT THE INVENTION

An embodiment to which the present invention is applied is described below with reference to the drawings.

Figure 1:
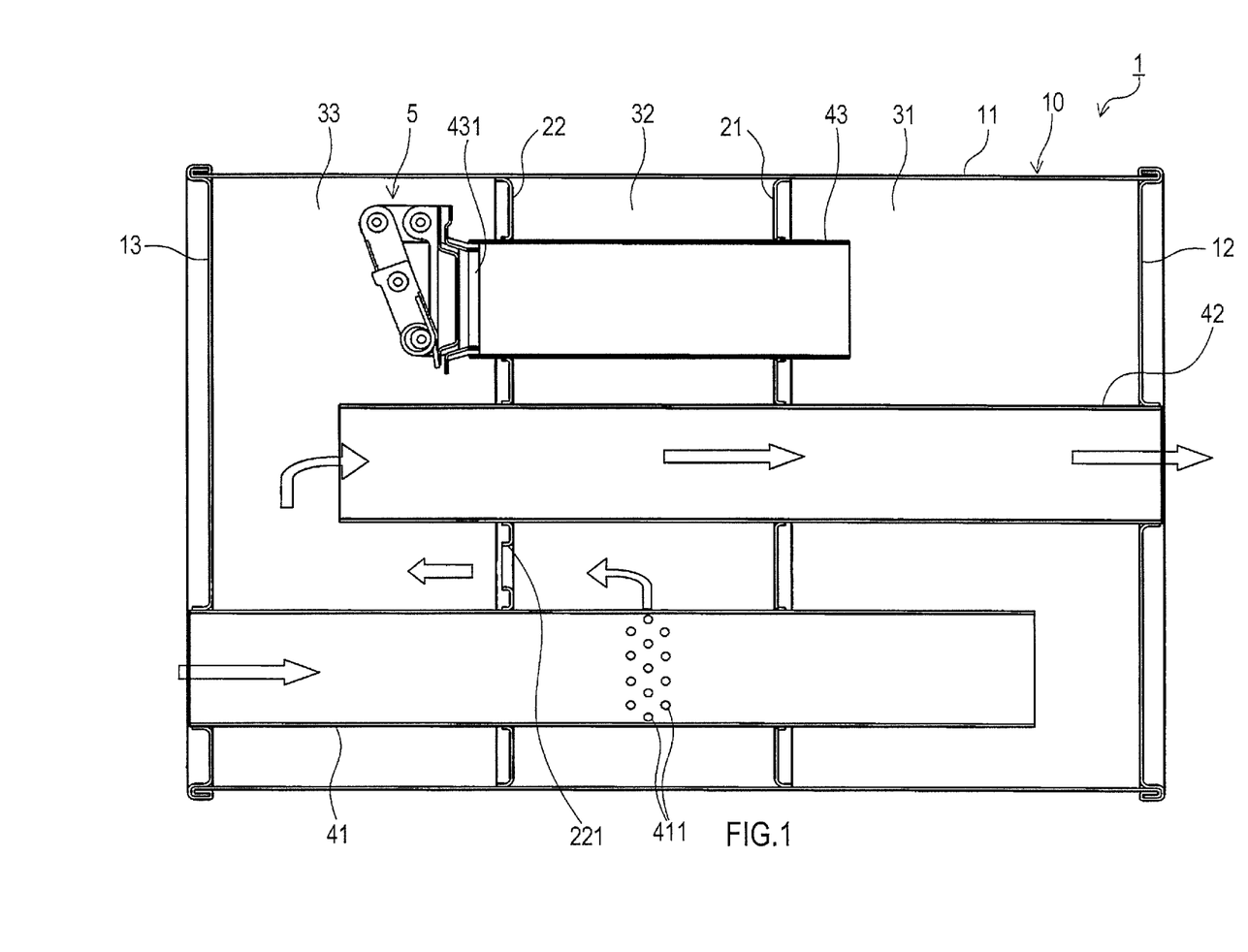
FIG. 1 is a sectional view of a muffler in which a valve device is in a valve closed state.

A muffler 1 shown in FIG. 1 forms a part of an exhaust gas flow path through which flows an exhaust gas discharged from an in-vehicle internal combustion engine (not shown). The muffler 1 includes a casing 10, in which openings at both ends of a cylindrical shell member 11 are closed by a rear lid member 12 and a front lid member 13. An inside of the casing 10 is partitioned into three chambers, i.e., a first chamber 31, a second chamber 32, and a third chamber 33 by a first separator 21 and a second separator 22.

The first chamber 31 is provided between the rear lid member 12 and the first separator 21. The second chamber 32 is provided between the first separator 21 and the second separator 22. The third chamber 33 is provided between the second separator 22 and the front lid member 13. The second separator 22 has a communication hole 221 provided therein that communicates the second chamber 32 and the third chamber 33 with each other.

The muffler 1 further includes an inlet pipe 41 through which the exhaust gas from the internal combustion engine is introduced. The inlet pipe 41 is provided so as to penetrate through the front lid member 13, the second separator 22, and the first separator 21 and to open to the first chamber 31 at its downstream-side end. Provided in an outer periphery of the inlet pipe 41 in the second chamber 32 are a plurality of through-holes 411 that communicate an internal space of the inlet pipe 41 and the second chamber 32 with each other.

The muffler 1 further includes an outlet pipe 42 to be connected to a not-shown tailpipe to discharge the exhaust gas. The outlet pipe 42 is provided so as to penetrate through the rear lid member 12, the first separator 21, and the second separator 22 and to open to the third chamber 33 at its upstream-side end.

The muffler 1 further includes an inner pipe 43 to form a communicating flow path that communicates the first chamber 31 and the third chamber 33 with each other. The inner pipe 43 is provided so as to penetrate through the first separator 21 and the second separator 22, to open to the first chamber 31 at its upstream-side end, and to open to the third chamber 33 at its downstream-side end. However, in the third chamber 33, the inner pipe 43 has, at the downstream-side end thereof, a valve device 5 mounted to open and close an opening 431 provided at the downstream-side end of the inner pipe 43.

As shown in FIGS. 2A, 2B, 3A, and 3B, the valve device 5 includes a stay 51, a butterfly valve 52, a first link member 53, and a second link member 54. The stay 51 is fixed in position with respect to the opening 431 provided at the downstream-side end of the inner pipe 43. Each of the butterfly valve 52 and the first link member 53 is supported at one end thereof by the stay 51. The second link member 54 is supported at one end thereof by the butterfly valve 52.

Figure 2A:
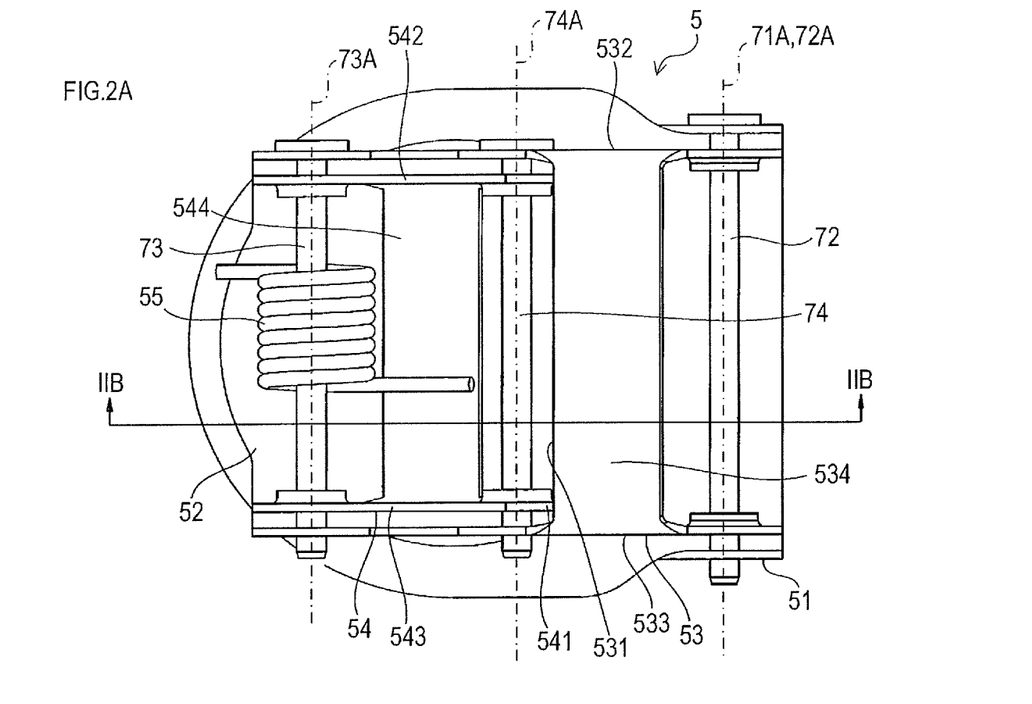
FIG. 2A is a plan view of the valve device according to the embodiment in a valve closed state.
Figure 2B:
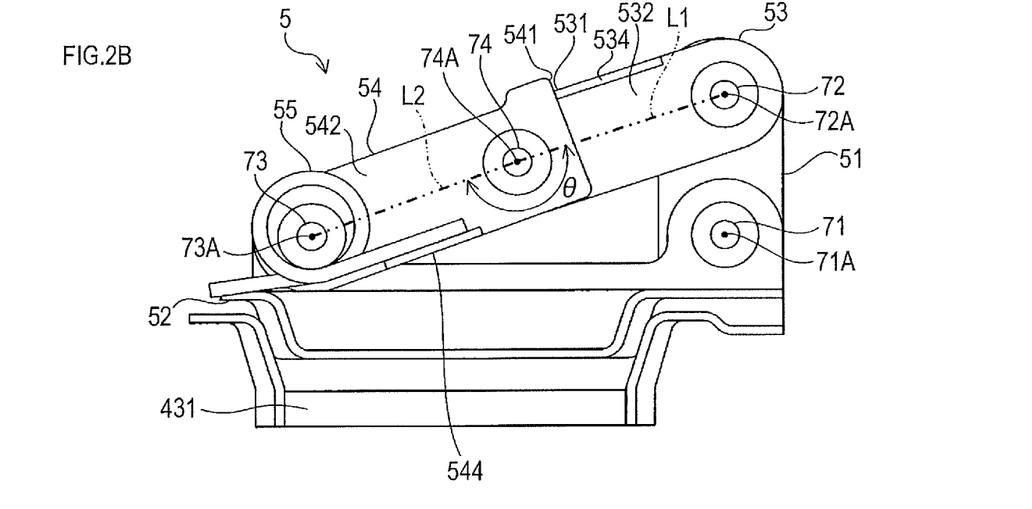
FIG. 2B is a sectional view thereof taken along line IIB-IIB.
Figure 3A:
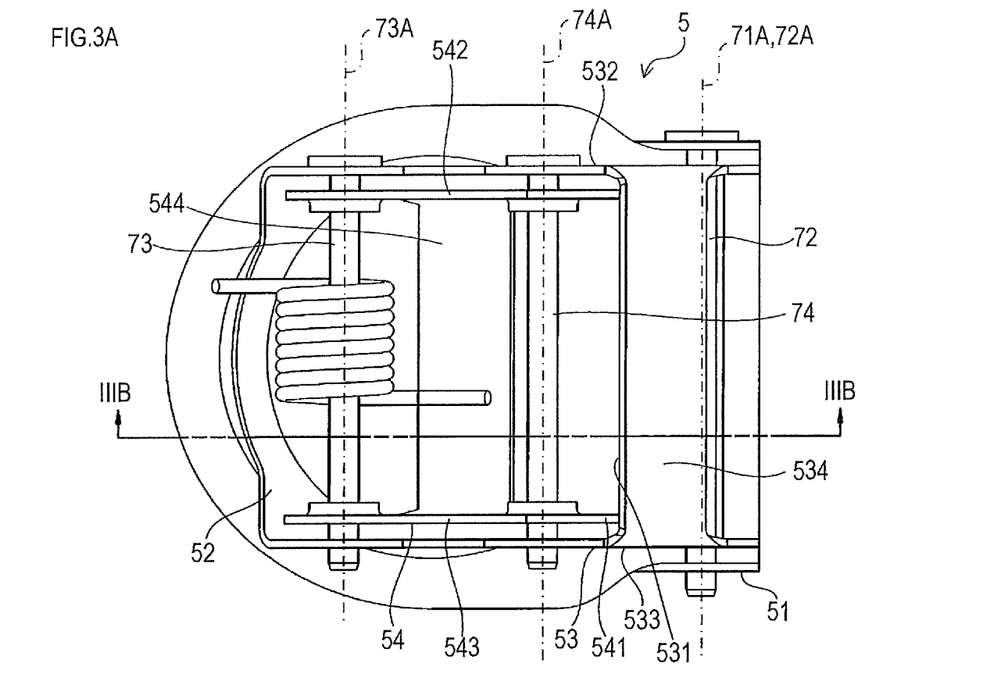
FIG. 3A is a plan view of the valve device according to the embodiment in a valve open state.
Figure 3B:
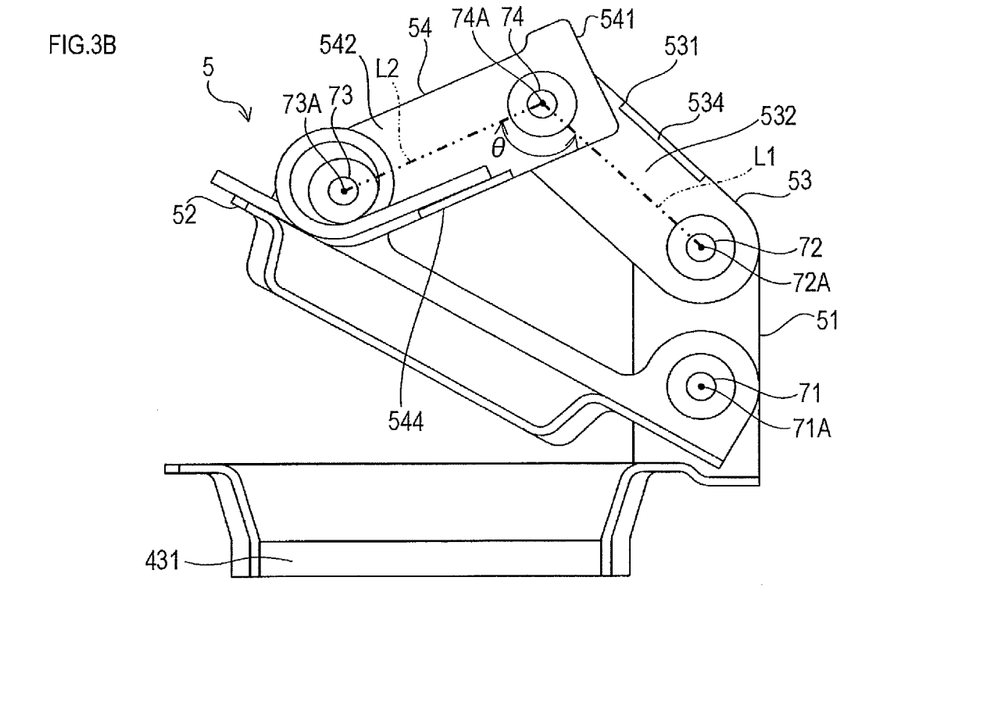
FIG. 3B is a sectional view thereof taken along line IIIB-IIIB.

The butterfly valve 52 is shaped so as to be able to close the opening 431 of the inner pipe 43, and is connected at an end thereof to the stay 51 via a first rotation axis member 71.

Specifically, the butterfly valve 52 is supported by the stay 51 so as to be rotationally movable about a rotation axis (hereinafter referred to as a "first rotation axis 71A") of the first rotation axis member 71, and opens and closes the opening 431 of the inner pipe 43 according to its rotational position.

The first link member 53 is connected at an end thereof to the stay 51 via a second rotation axis member 72. Specifically, the first link member 53 is supported by the stay 51 so as to be rotationally movable about a rotation axis (hereinafter referred to as a "second rotation axis 72A") of the second rotation axis member 72.

The second link member 54 is connected at an end thereof to an upper surface (a portion that stands up with valve opening) of the butterfly valve 52 via a third rotation axis member 73. Specifically, the second link member 54 is supported by the butterfly valve 52 so as to be rotationally movable about a rotation axis (hereinafter referred to as a "third rotation axis 73A") of the third rotation axis member 73.

The first link member 53 and the second link member 54 are connected to each other via a fourth rotation axis member 74. Specifically, the first link member 53 and the second link member 54 are connected to each other so as to be mutually rotationally movable about a rotation axis (hereinafter referred to as a "fourth rotation axis 74A") of the fourth rotation axis member 74. The first rotation axis 71A, the second rotation axis 72A, the third rotation axis 73A, and the fourth rotation axis 74A are parallel to one another in an axial direction.

Due to such a configuration, the stay 51, the butterfly valve 52, the first link member 53, and the second link member 54 form a toggle mechanism of a link type. The butterfly valve 52 is rotationally movable from a valve closed state (FIGS. 2A and 2B) in which the opening 431 of the inner pipe 43 is closed to a valve open state (FIGS. 3A and 3B) in which the opening 431 of the inner pipe 43 is open.

The valve device 5 further includes a spring 55 to bias the butterfly valve 52 in a valve closed direction. The spring 55 is mounted to the third rotation axis member 73, and applies a biasing force in a direction to bring the butterfly valve 52 and the second link member 54 closer to a positional relationship (angle) in a valve closed state. Accordingly, in its regular state (a state in which no external force to open the butterfly valve 52 is applied), the butterfly valve 52 is in a valve closed state.

The first link member 53 and the second link member 54 are designed to be arranged in an approximately straight line in a valve closed state. In other words, in a plane orthogonal to the first rotation axis 71A, an angle θ formed by a first link line L1 connecting the second rotation axis 72A (specifically, an intersection between the axis and the plane, and the same applies hereafter) and the fourth rotation axis 74A to each other and a second link line L2 connecting the third rotation axis 73A and the fourth rotation axis 74A to each other is an angle close to 180 degrees in a valve closed state (FIGS. 2A and 2B). It is designed so that the angle θ becomes smaller as the butterfly valve 52 is rotationally moved in a valve open direction (FIGS. 3A and 3B), and the angle θ in a valve closed state is formed to be the largest. Accordingly, in a valve closed state, a strong external force is required to rotationally move the butterfly valve 52 in the valve open direction.

Further provided in the valve device 5 is a stopper mechanism to limit the angle θ formed by the first link line L1 and the second link line L2 to an angle smaller than 180 degrees. Specifically, the stopper mechanism includes a first stopper portion 531 provided on the first link member 53 and a second stopper portion 541 provided on the second link member 54. The angle θ formed by the first link line L1 and the second link line L2 is limited to an angle smaller than 180 degrees by abutment of the first stopper portion 531 and the second stopper portion 541 against each other.

In the present embodiment, the first link member 53 includes side plate portions 532 and 533 provided on its both sides in an axial direction, and a coupling plate portion 534 coupling the side plate portions 532 and 533 to each other. Similarly, the second link member 54 includes side plate portions 542 and 543 provided on its both sides in an axial direction, and a coupling plate portion 544 provided on its both sides in an axial direction, and a coupling plate 544 coupling the side plate portions 542 and 543 to each other. Furthermore, it is configured such that the coupling plate portion 534 of the first link member 53 and the side plate portions 542 and 543 of the second link member 54 abut against each other. That is, the coupling plate portion 534 of the first link member 53 functions as the first stopper portion 531, and the side plate portions 542 and 543 of the second link member 54 function as the second stopper portion 541.

Next, an explanation will be given about an action of the valve device 5. The exhaust gas from the internal combustion engine is introduced into the second chamber 32 via the plurality of through-holes 411 formed in the inlet pipe 41, as indicated by arrows in FIG. 1, and noise is silenced by an expansion effect and a resonance effect. Subsequently, the exhaust gas in the second chamber 32 is introduced into the third chamber 33 via the communication hole 221 formed in the second separator 22, and noise is further silenced by an expansion effect and a resonance effect. In this way, the exhaust gas in the third chamber 33, pressure pulsation of which has been smoothed and noise of which has been silenced, is discharged to the outside via the outlet pipe 42.

Here, when a pressure in the first chamber 31 is still low, e.g., when the number of revolutions of the internal combustion engine is low, a pressure difference between that in the first chamber 31 and that in the third chamber 33 is small. At this time, an acting force exerted on the butterfly valve 52 of the valve device 5 by the pressure in the first chamber 31 is smaller than an acting force exerted on the butterfly valve 52 of the valve device 5 by a load applied by the toggle mechanism and the spring 55 in the valve device 5 and the pressure in the third chamber 33. Accordingly, the opening 431 of the inner pipe 43 is closed by the butterfly valve 52.

Figure 4:
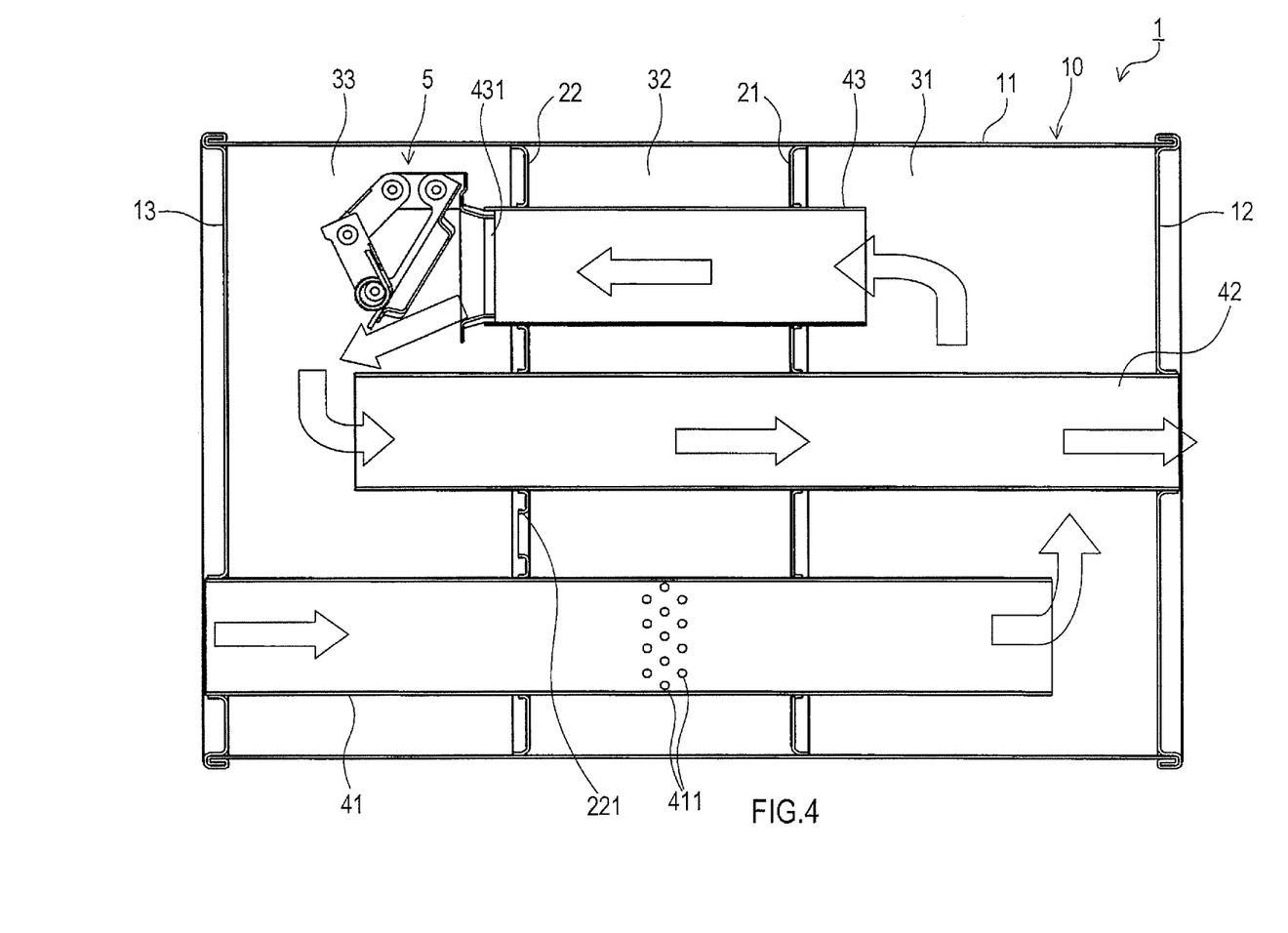
FIG. 4 is a sectional view of the muffler in which the valve device is in a valve open state.

In contrast, when operating conditions of the internal combustion engine have changed and, for example, when the number of revolutions of the internal combustion engine is increased to increase an amount of the exhaust gas and the pressure is increased to a predetermined pressure, the acting force exerted on the butterfly valve 52 of the valve device 5 by the pressure in the first chamber 31 becomes larger than the acting force exerted on the butterfly valve 52 of the valve device 5 by the load applied by the toggle mechanism and the spring 55 in the valve device 5 and the pressure in the third chamber 33. As a result, as shown in FIG. 4, the butterfly valve 52 is spaced apart from the opening 431 of the inner pipe 43 against the latter acting force to open the opening 431, and the first chamber 31 and the third chamber 33 thereby communicate with each other via the inner pipe 43.

In this way, the opening 431 of the inner pipe 43 is opened and a communicating flow path (a bypass flow path) is formed separately when the pressure in the first chamber 31 is increased to the predetermined pressure or more, and thus, even when an amount of the exhaust gas introduced into the first chamber 31 is increased, such exhaust gas is promptly discharged to the third chamber 33. Consequently, the pressure in the first chamber 31 is not increased, and even when the pressure of the exhaust gas from the internal combustion engine is increased, an increase in back pressure thereof can be suppressed. Furthermore, even when a flow rate of the exhaust gas is increased, an increase in pressure in the muffler 1 can be suppressed and, thus, airflow noise is reduced.

As described above, in the valve device 5 according to the present embodiment, the stay 51, the butterfly valve 52, the first link member 53, and the second link member 54 form the toggle mechanism of a link type. Since the angle θ formed by the first link line L1 and the second link line L2 in a valve closed state is an angle close to 180 degrees, a strong external force is required to rotationally move the butterfly valve 52 in the valve open direction. Accordingly, it is possible to make the external force required to open the butterfly valve 52 greater, while weakening a biasing force of the spring 55, compared with a conventional configuration in which a butterfly valve is kept in a valve closed state solely by means of a spring. That is, it is possible to reduce a load to keep the butterfly valve 52 in a valve open state, while increasing a load to bring the butterfly valve 52 from a valve closed state to a valve open state. Consequently, it is possible to reduce pressure loss at the time of high revolution of the internal combustion engine, while reducing noise by improving air-tightness at the time of low revolution or initial explosion of the internal combustion engine. In addition, a striking noise made when the butterfly valve 52 is closed can be reduced because the biasing force of the spring 55 can be weakened.

Figure 5A:
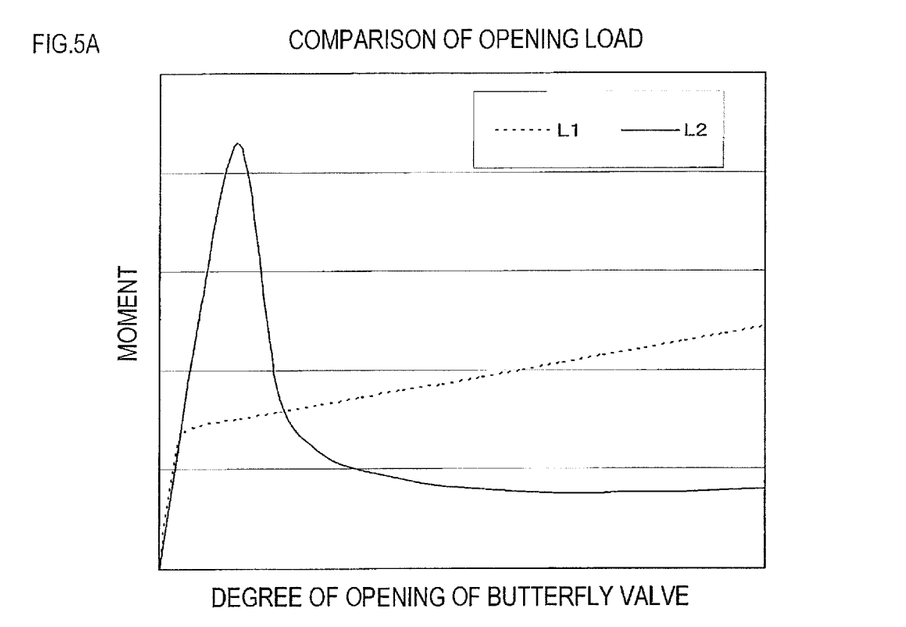
FIG. 5A is a graph showing an opening load of a butterfly valve configured in a conventional manner and an opening load of a butterfly valve configured according to the embodiment.
Figure 5B:
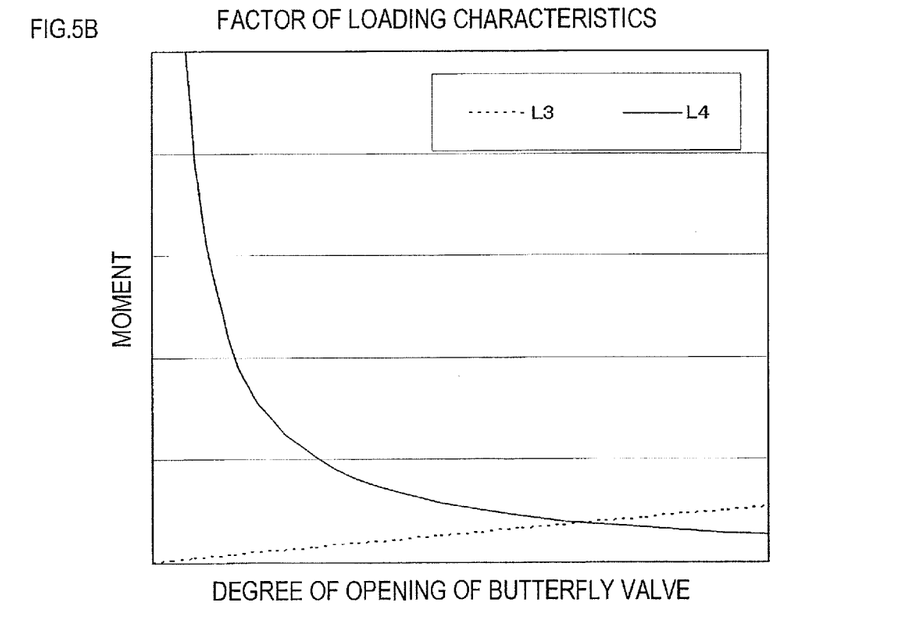
FIG. 5B is a graph showing loading characteristics of a toggle mechanism and a spring.

Specifically, as shown in FIG. 5A, in the conventional configuration in which a butterfly valve is kept in a valve closed state solely by means of a spring, the larger a degree of opening (an opening amount) of the butterfly valve is, the larger a moment (an opening load at the time when the butterfly valve is pushed in a direction in which the exhaust gas flows) becomes (a broken line L1). In contrast, in the configuration according to the present embodiment, in which the butterfly valve 52 is kept in a valve closed state by means of the toggle mechanism and the spring 55, a moment at the time when the butterfly valve 52 starts opening becomes larger (a solid line L2). That is, as shown in FIG. 5B, the spring 55 has linear characteristics such that the larger the degree of opening of the butterfly valve 52 is, the larger the moment becomes (a broken line L3), and the toggle mechanism has characteristics such that the moment becomes largest when the butterfly valve 52 is in a valve closed state (a solid line L4). Therefore, in the configuration according to the present embodiment, in which the butterfly valve 52 is kept in a valve closed state by means of the toggle mechanism and the spring 55, it is possible to decrease the moment in a state in which the degree of opening of the butterfly valve 52 is larger, while increasing the moment in a state in which the degree of opening is smaller.

Since the valve device 5 has the stopper mechanism provide therein, a problem that the butterfly valve 52 cannot be normally opened when the angle θ formed by the first link line L1 and the second link line L2 has reached 180 degrees can be made less likely to occur. Such a stopper mechanism is especially effective to make the angle θ formed by the first link line L1 and the second link line L2 in a valve closed state closer to 180 degrees. This is because it is assumed that the closer to 180 degrees the angle θ in a valve closed state is, the more likely an actually formed angle under the influence of variations in parts dimensions, rattling of parts, or the like reaches 180 degrees.

Especially, the stopper mechanism according to the present embodiment is provided to the first link member 53 and the second link member 54 themselves that form the first link line L1 and the second link line L2, respectively, and thus, it is possible to reduce the influence of factors such as variations in parts dimensions and rattling of parts on a limit angle. As a result, the angle θ in a valve closed state can be designed to be an angle closer to 180 degrees, and a configuration with high performance to keep a valve closed state against an external force can be achieved.

The first chamber 31 corresponds to an example of an upstream chamber, and the third chamber 33 corresponds to an example of a downstream chamber. The valve device 5 corresponds to an example of a valve device for an exhaust gas flow path, the stay 51 corresponds to an example of a support body, the butterfly valve 52 corresponds to an example of a valve body, the first link member 53 and the second link member 54 correspond to an example of a first link member and a second link member, respectively, and the spring 55 corresponds to an example of a biasing member. The first rotation axis 71A to the fourth rotation axis 74A correspond to an example of a first rotation axis to a fourth rotation axis, respectively, and the first link line L1 and the second link line L2 correspond to an example of a first link line and a second link line, respectively.

The embodiment of the present invention has been described hereinabove. However, it is to be appreciated that the present invention is not limited to the above-described embodiment and can take various forms.

Figure 6A:
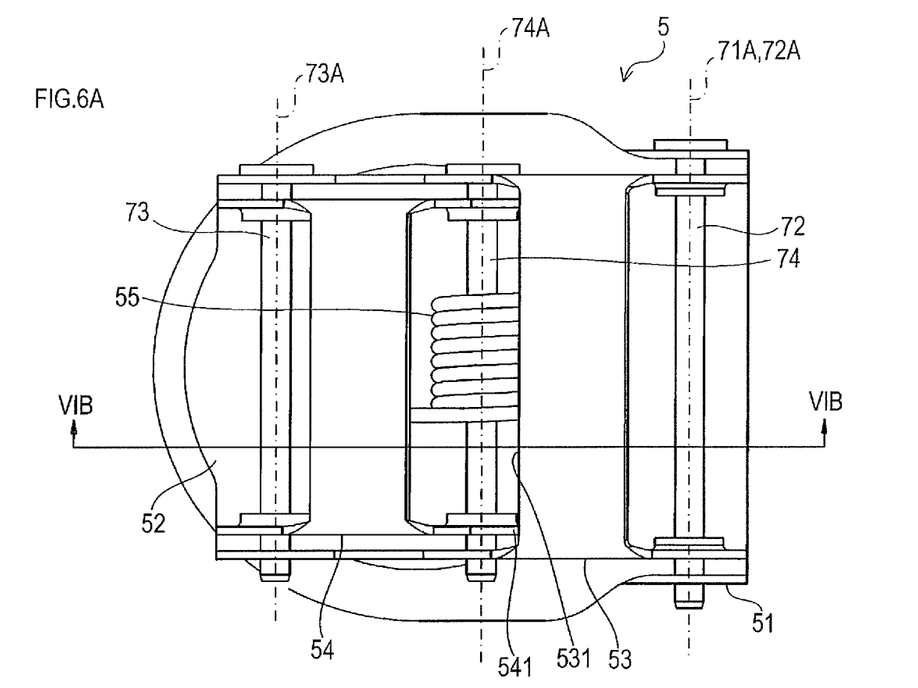
FIG. 6A is a plan view of a valve device according to a first modified example in a valve closed state.
Figure 6B:
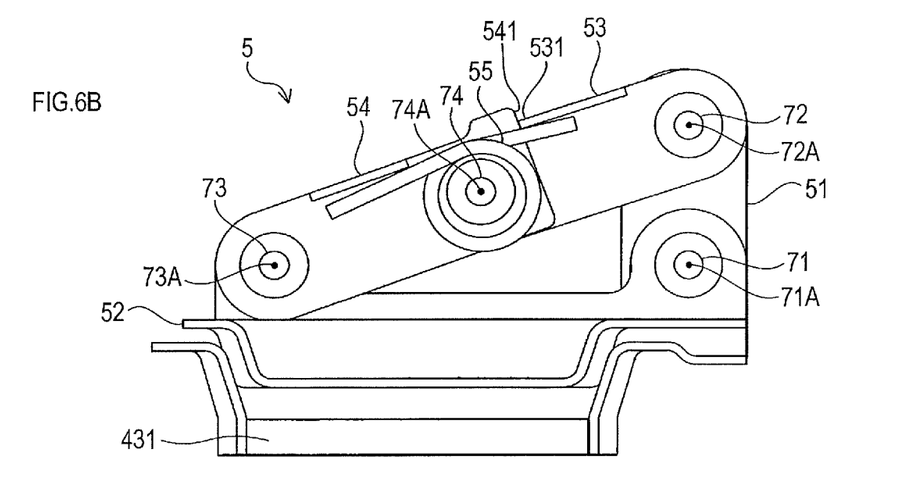
FIG. 6B is a sectional view thereof taken along line VIB-VIB.
Figure 7A:
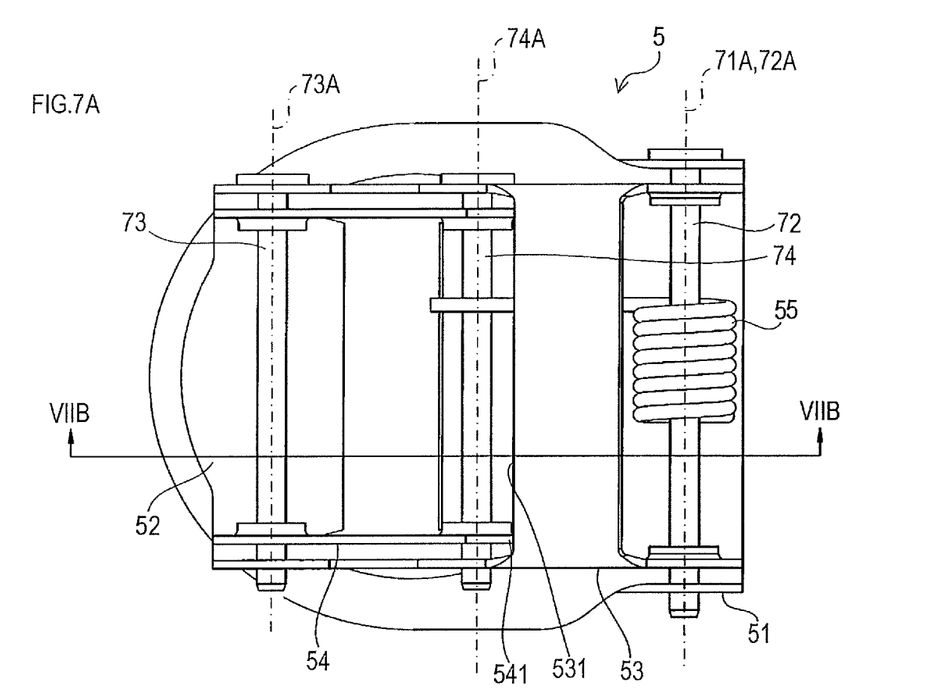
FIG. 7A is a plan view of a valve device according to a second modified example in a valve closed state.
Figure 7B:
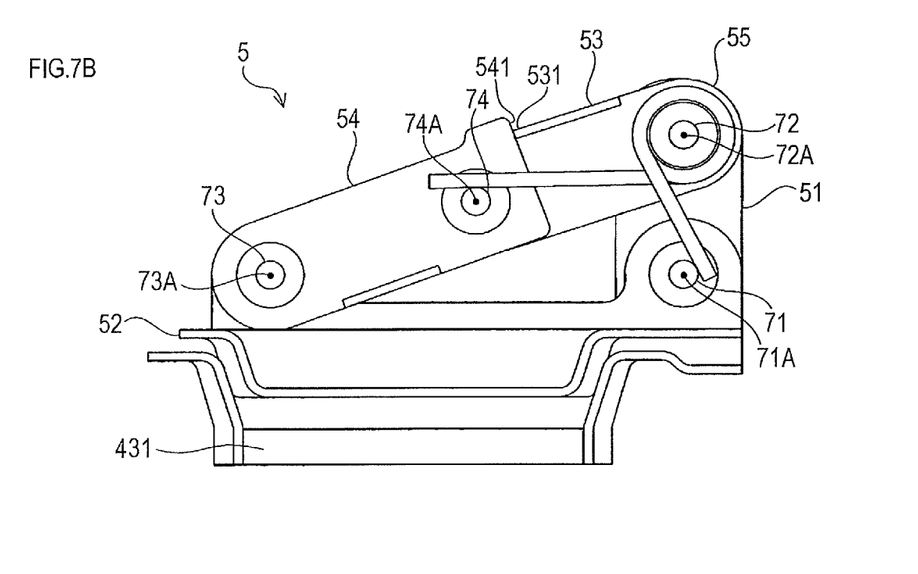
FIG. 7B is a sectional view thereof taken along line VIIB-VIIB.

(1) In the above-described embodiment, as a biasing device to bias the butterfly valve 52 in the valve closed direction, the spring 55 to apply a biasing force in a direction to bring the butterfly valve 52 and the second link member 54 closer to a positional relationship (angle) in a valve closed state is exemplified. However, the biasing device is not limited to this. As shown in FIGS. 6A and 6B for example, a configuration may be adopted in which the spring 55 is mounted to the fourth rotation axis member 74 and a biasing force is applied in a direction to bring the first link member 53 and the second link member 54 closer to a positional relationship (angle) in a valve closed state. Alternatively, as shown in FIGS. 7A and 7B for example, a configuration may be adopted in which the spring 55 is mounted to the second rotation axis member 72 and a biasing force is applied in a direction to bring the stay 51 and the first link member 53 closer to a positional relationship (angle) in a valve closed state.

Figure 8A:
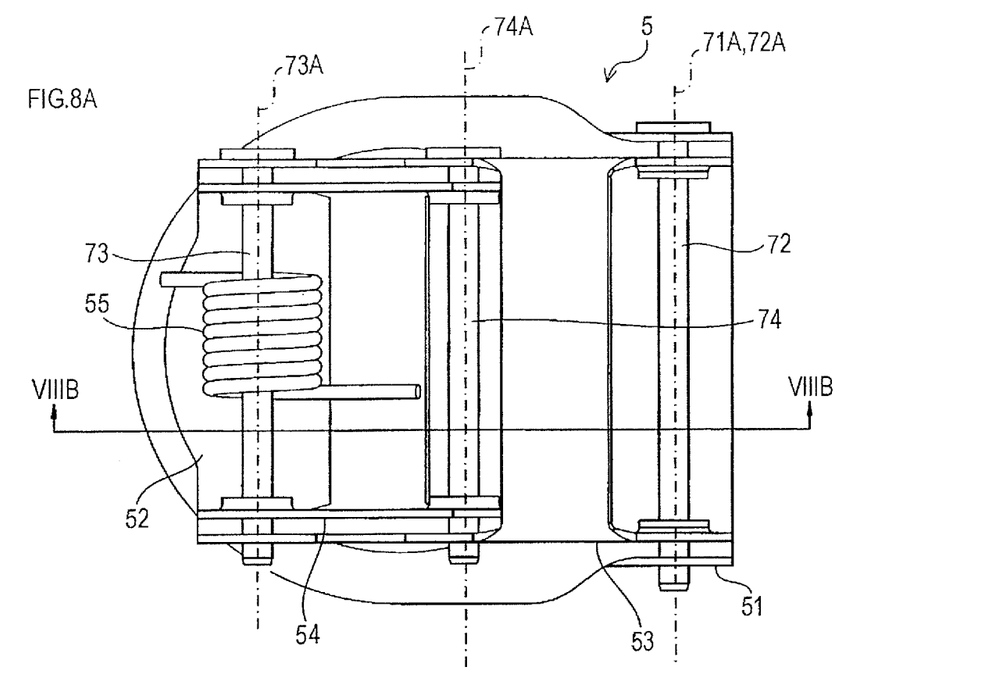
FIG. 8A is a plan view of a valve device according to a third modified example in a valve closed state.
Figure 8B:
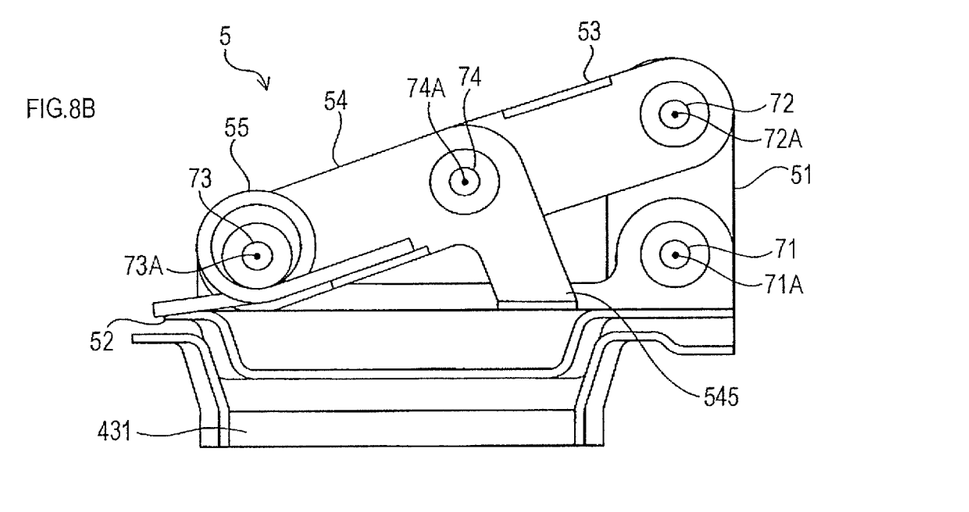
FIG. 8B is a sectional view thereof taken along line VIIIB-VIIIB.

(2) In the above-described embodiment, the stopper mechanism configured such that the first stopper portion 531 provided on the first link member 53 and the second stopper portion 541 provided on the second link member 54 abut against each other is exemplified. However, the stopper mechanism is not limited to this. As shown in FIGS. 8A and 8B for example, a configuration may be adopted in which the angle θ formed by the first link line L1 and the second link line L2 is limited to an angle smaller than 180 degrees by abutment of a protruding portion 545 formed in the second link member 54 against the upper surface of the butterfly valve 52.

(3) A positional relationship of the first rotation axis 71A to the fourth rotation axis 74A with respect to one another is not limited to that exemplified in the above-described embodiment. As shown in FIGS. 9A to 9F for example, various positional relationships can be adopted. In these figures, points at the intersections of the first rotation axis 71A to the fourth rotation axis 74A with the plane orthogonal to these axes are referred to as A to D, respectively. In each of these figures, a valve closed state is shown with a solid line, and a valve open state is shown with a broken line.

Figure 9A:
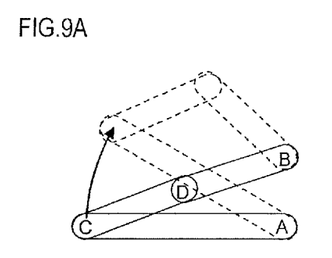
FIG. 9A is a schematic diagram showing an example of a toggle mechanism in which a relationship BD=CD is satisfied.
Figure 9B:
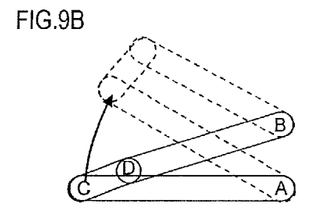
FIG. 9B is a schematic diagram showing an example of a toggle mechanism in which a relationship BD>CD is satisfied.
Figure 9C:
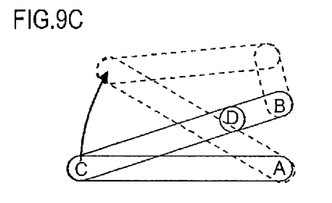
FIG. 9C is a schematic diagram showing an example of a toggle mechanism in which a relationship BD<CD is satisfied.

For example, a relationship between a line segment BD (a length of the first link line L1) and a line segment CD (a length of the second link line L2) may be BD=CD as shown in FIG. 9A, may be BD>CD as shown in FIG. 9B, or may be BD<CD as shown in FIG. 9C.

Figure 9D:
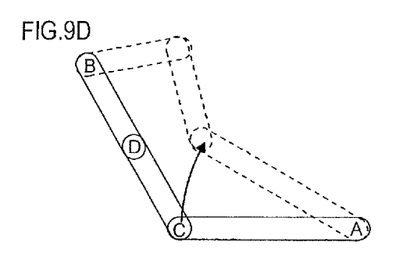
FIG. 9D is a schematic diagram showing an example of a toggle mechanism in which a position of a point B lies outside an arc-shaped movement locus of a point C.
Figure 9E:
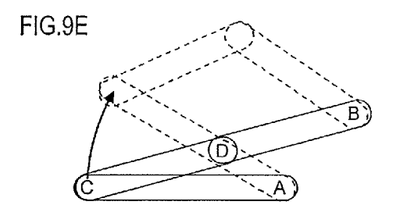
FIG. 9E is a schematic diagram showing an example of a toggle mechanism in which a position of a point B lies in a position where an angle formed by a line segment AB and a line segment AC is greater than 90 degrees.
Figure 9F:
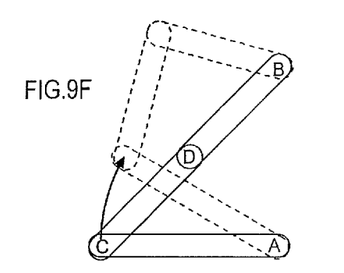
FIG. 9F is a schematic diagram showing an example of a toggle mechanism in which a position of a point B lies in a position where a relationship AB>AC is satisfied.

As shown in FIG. 9D, a position of a point B (a position of the second rotation axis 72A) may lie outside an arc-shaped movement locus of a point C. As shown in FIG. 9E, a position of a point B may lie in a position where an angle formed by a line segment AB and a line segment AC is larger than 90 degrees. As shown in FIG. 9F, a position of a point B may lie in a position where a relationship AB>AC is satisfied.

(4) In the above-described embodiment, the configuration in which the valve device 5 is mounted to the inner pipe 43 at the downstream-side end thereof is exemplified. However, a position where the valve device 5 is mounted is not limited to this. For example, the valve device 5 may be mounted to a through-hole provided in the second separator 22.

The invention claimed is:

1. A valve device for an exhaust gas flow path, the device comprising: a support body; a valve body that is supported by the support body so as to be rotationally movable about a first rotation axis and that opens and closes a communicating flow path that communicates an upstream chamber and a downstream chamber in an exhaust gas flow path with each other; a first link member supported by the support body so as to be rotationally movable about a second rotation axis; a second link member supported by the valve body so as to be rotationally movable about a third rotation axis; and a biasing member to bias the valve body in a valve closed direction, wherein the first link member and the second link member are connected to each other so as to be mutually rotationally movable about a fourth rotation axis, wherein the first rotation axis, the second rotation axis, the third rotation axis, and the fourth rotation axis are parallel to one another in an axial direction, wherein, in a plane orthogonal to the axes, an angle formed by a first link line connecting the second rotation axis and the fourth rotation axis to each other and a second link line connecting the third rotation axis and the fourth rotation axis to each other is formed largest in a state in which the communicating flow path is closed by the valve body, a stopper mechanism to limit the angle formed by the first link line and the second link line, and wherein a distance between the first rotation axis and the third rotation axis is longer than a distance between the second rotation axis and the fourth rotation axis.

2. The valve device for an exhaust gas flow path according to claim 1, wherein the stopper mechanism limits the angle formed by the first link line and the second link line by abutment of a first stopper portion provided on the first link member and a second stopper portion provided on the second link member against each other.

3. The valve device for an exhaust gas flow path according to claim 1, wherein the stopper mechanism limits the angle formed by the first link line and the second link line to an angle smaller than 180 degrees.

4. The valve device for an exhaust gas flow path according to claim 1, wherein, in the plane orthogonal to the axes, the angle formed by the first link line and the second link line is an angle close to 180 degrees in the state in which the communicating flow path is closed by the valve body.

5. The valve device for an exhaust gas flow path according to claim 1, wherein the third rotation axis is positioned at a leading end side of the valve body.

6. The valve device for an exhaust gas flow path according to claim 1, wherein a distance between the first rotation axis and the third rotation axis is longer than a distance between the third rotation axis and the fourth rotation axis.

7. The valve device for an exhaust gas flow path according to claim 1, wherein a distance between the first rotation axis and the third rotation axis is longer than a distance between the first rotation axis and the second rotation axis.

8. The valve device for an exhaust gas flow path according to claim 1, wherein, in the state in which the communicating flow path is closed by the valve body, in the plane orthogonal to the axes, the angle formed by the first link line and the second link line is larger than an angle formed by a line connecting the second rotation axis and the first rotation axis to each other and a line connecting the third rotation axis and the first rotation axis to each other.

9. The valve device for an exhaust gas flow path according to claim 1,
wherein the biasing member is mounted to a rotation axis member which is movable about the third rotation axis, and biases the valve body in the valve closed direction by applying a biasing force in a direction to bring the valve body and the second link member closer to an angle in a valve closed state.

10. The valve device for an exhaust gas flow path according to claim 1, wherein the biasing member is mounted to a rotation axis member which is movable about the fourth rotation axis, and biases the valve body in the valve closed direction by applying a biasing force in a direction to bring the first link member and the second link member closer to an angle in a valve closed state.

11. The valve device for an exhaust gas flow path according to claim 2, wherein the stopper mechanism limits the angle formed by the first link line and the second link line to an angle smaller than 180 degrees.

12. The valve device for an exhaust gas flow path according to claim 3, wherein, in the plane orthogonal to the axes, the angle formed by the first link line and the second link line is an angle close to 180 degrees in the state in which the communicating flow path is closed by the valve body.

13. The valve device for an exhaust gas flow path according to claim 4, wherein the third rotation axis is positioned at a leading end side of the valve body.

14. The valve device for an exhaust gas flow path according to claim 1, wherein, in the plane orthogonal to the axes, the first link line and the second link line are configured to be arranged in an approximately straight line in the state in which the communicating flow path is closed by the valve body.

15. The valve device for an exhaust gas flow path according to claim 1, wherein the stopper mechanism is configured to prevent an angle formed by the first link line and the second link line from reaching 180 degrees.

16. The valve device for an exhaust gas flow path according to claim 1, wherein the third rotation axis is positioned at an end of the valve body opposite to an end where the first rotation axis is positioned.

17. The valve device for an exhaust gas flow path according to claim 2, wherein each of the first link member and the second link member comprise two side plate portions on both sides thereof in an axial direction, and a coupling plate portion that couples the two side plate portions, wherein, by an abutment of the coupling plate portion of the first link member and the two side plate portions of the second link member, the stopper mechanism limits an angle formed by the first link line and the second link line.

* * * * *